United States Patent

Bilge et al.

[11] Patent Number: 5,183,992
[45] Date of Patent: Feb. 2, 1993

[54] LASER WELDING METHOD

[75] Inventors: Umit Bilge, Mt. Clemens; Christopher E. Jurczyszyn, Livonia; William C. Jenuwine, Marine City, all of Mich.

[73] Assignee: General Motors Corporation, Detroit, Mich.

[21] Appl. No.: 750,837

[22] Filed: Aug. 29, 1991

[51] Int. Cl.⁵ .................................................. B23K 26/00
[52] U.S. Cl. ............................. 219/121.64; 219/121.84
[58] Field of Search .................... 219/121.63, 121.64, 219/121.82, 121.83, 121.84

[56] References Cited

U.S. PATENT DOCUMENTS

| | | | |
|---|---|---|---|
| 4,642,446 | 2/1987 | Pennington | 219/121.64 |
| 4,682,002 | 7/1987 | Delle Piane et al. | 219/121.64 |
| 4,734,550 | 3/1988 | Imamura et al. | 219/121.77 |
| 4,745,257 | 5/1988 | Rito et al. | 219/121.64 |
| 4,916,284 | 4/1990 | Petrick | 219/121.64 |

*Primary Examiner*—C. L. Albritton
*Attorney, Agent, or Firm*—Creighton R. Meland

[57] ABSTRACT

A method of laser welding steel sheets that have a thin corrosion protective coating of zinc. The steel sheets are positioned vertically. A laser beam, which is positioned normal to the sheets is applied to the sheets to melt the material of the sheets and create a weld. During welding, the sheets and laser beam are moved vertically relative to each other such that laser heating of the material creates a cavity. Liquid or molten material flows vertically downwardly by gravity to elongate the cavity and thereby facilitate the escape of zinc vapors from the cavity.

4 Claims, 1 Drawing Sheet

LASER WELDING METHOD

This invention relates to a method of laser lap welding steel sheets that are coated with a corrosion protective coating of zinc which facilitates the escape of zinc vapors from the weld zone during laser welding.

BACKGROUND OF THE INVENTION

Laser welding of galvanized steel sheets, that is, steel sheets that have a thin coating of zinc for corrosion protection are well known to those skilled in the art. A problem associated with laser welding steel sheets that have a zinc coating is that the zinc vaporizes during laser welding creating zinc vapors. These zinc vapors can cause porosity in the weld nugget with reduces the integrity and quality of the weld.

The zinc vapor problem associated with laser welding is known and various solutions have been proposed to deal with this problem as described in the U.S. Pat. Nos. 4,642,446 to Pennington; 4,916,284 to Petrick; 4,682,002 to Delle Piane et al.; and to 4,745,257 to Rito et al. In Pennington the zinc coating is removed and replaced by a nickel-base coating over selected areas where laser welding is to take place. In Rito et al. and Delle Piane et al. spacers are used to space the sheets to be welded thereby providing a path for the escape of zinc vapors. In Petrick the parts to be welded are shaped to provide a path for the escape of zinc vapors.

SUMMARY OF THE INVENTION

The laser welding method of this invention facilitates the escape of zinc vapors during laser welding without requiring the use of spacers to space the parts being welded and, in fact, the laser welding method of this invention can be used where there is no gap between the steel sheets to be laser welded. In practicing the laser welding method of this invention, two steel sheets that have zinc coatings are clamped together and maintained in a vertical position, that is, the two steel sheets extend vertically. During laser welding of the sheets, a laser beam is directed against one vertically extending surface of one of the sheets. This laser beam is normal to the vertically disposed steel sheets. The sheets and laser beam are now moved vertically relative to each other such that laser heating of the material of the sheets forms a cavity. This cavity is defined in part by liquid or molten material that flows vertically downwardly by gravity. The cavity that is formed facilitates the escape of zinc vapors that are developed during laser welding of the zinc-coated steel sheets.

DETAILED DESCRIPTION OF THE INVENTION

Figure 1:
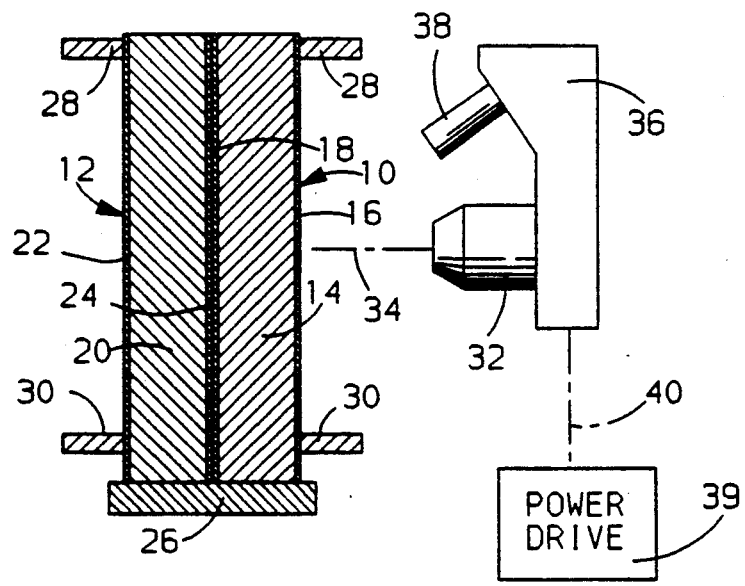
FIG. 1 illustrates apparatus for performing a laser welding method in accordance with this invention.

Referring to FIG. 1, two sheets 10 and 12 of galvanized steel are shown. The sheet 10 comprises a low carbon steel sheet 14 which is coated on opposite sides with zinc to form thin zinc layers 16 and 18. The galvanized sheet 12 is comprised of a low carbon steel sheet 20 which is coated on opposite sides to form thin zinc layers 22 and 24. By way of example and not by way of limitation, the sheets 10 and 12 may have a thickness of about 0.028 inches. The thickness of sheets 10 and 12 could be greater than 0.028 inches.

To perform the laser welding method of this invention, the sheets 10 and 12 are disposed in a vertical position, or in other words, extend vertically. As will be described hereinafter, the sheets 10 and 12 can be positioned such that they are located at a slight angle to a true or absolute vertical position. To position the sheets vertically, the sheets 10 and 12 engage a planar upper surface of a lower horizontally extending support 26. Further, to maintain sheets 10 and 12 in a vertical position during laser welding, the clamps 28 and 30 are provided that clamp the sheets together and also maintain them in a vertically extending position. The clamping pressure can be such that zinc layers 18 and 24 are tightly engaged. There is no need to provide a gap between layers 18 and 24. However, the method of this invention is applicable to an arrangement in which the layers 18 and 24 are not tightly clamped together and is applicable to an arrangement in which there might be slight gaps between layers 18 and 24 due to, for example, two steel sheets that have outer surfaces that do not entirely lie exactly in a plane.

The apparatus for performing the method of this invention comprises a laser beam generating apparatus 32 which directs a laser beam 34 toward sheet 10 in a manner to be described in more detail hereinafter. The laser beam generator is carried by a vertically movable support 36. This support 36 also carries a pipe 38 that is connected to a cover gas supply (not illustrated). This cover gas is directed by a pipe 38 to the zone being welded in a manner known to those skilled in the art.

The support 36 is movable in a vertical direction and to move the support 36 a power drive apparatus 39 is shown. The dotted line 40 diagramatically illustrates means for moving the support 36 vertically. The apparatus for moving support 36 preferably is a robot which is capable of moving support 36 and consequently laser 32 and pipe 38 along a vertical line that is parallel to sheets 10 and 12.

The laser beam 34 is normal to sheets 10 and 12 and the laser generator 32 is moved along a line that is parallel to sheets 10 and 12.

The laser lap welding of sheets 10 and 12 will now be described in connection with FIGS. 1 and 2. Assume that sheets 10 and 12 are held in a vertical position as shown in FIG. 1. To initiate welding, the support 36 and attached laser 32 are moved downwardly to a reference position where welding is to start. The support 36 and laser beam generator 32 are now moved vertically upwardly. At the same time the laser beam generator 32 is energized to cause laser beam 34 to be directed against panel 10. As previously mentioned, the laser beam 34 is normal to sheets 10 and 12 and it remains normal to these sheets as it is moved vertically upwardly.

Figure 2:
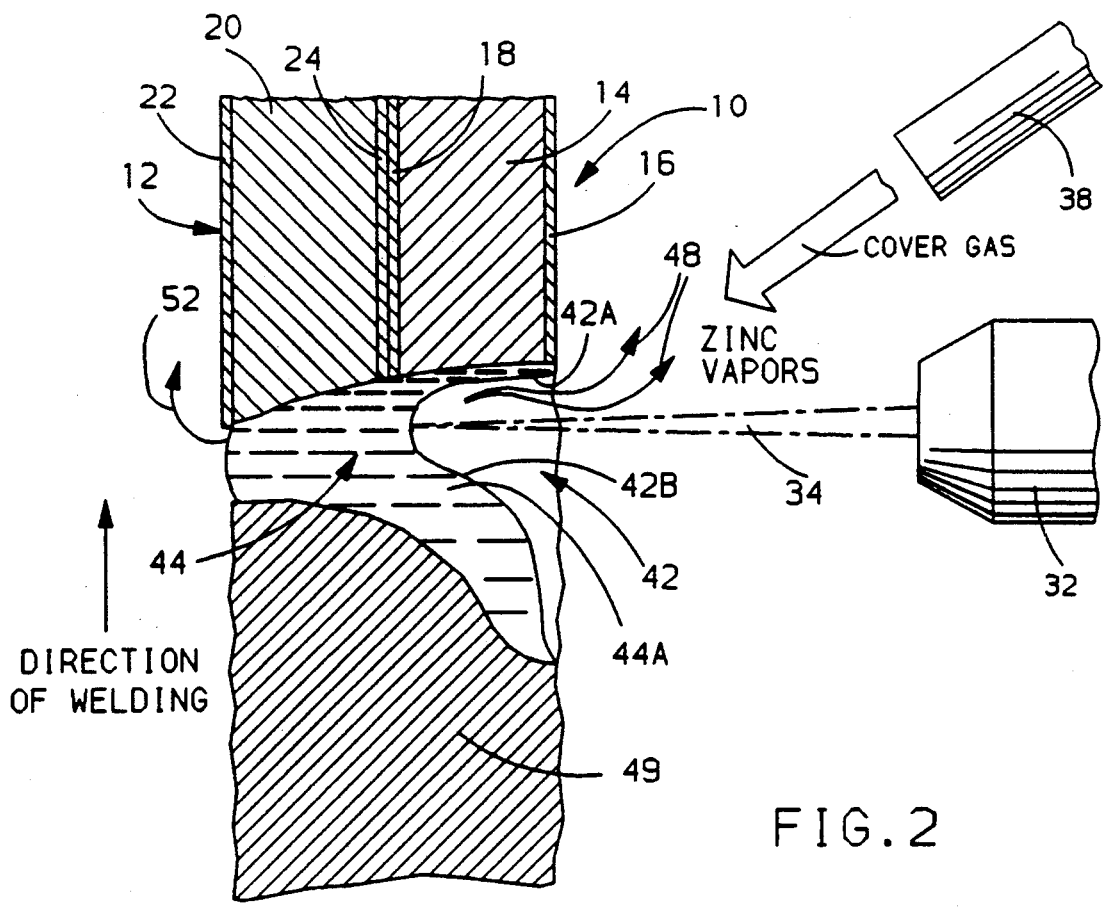
FIG. 2 is a cross-sectional view illustrating the laser weld made by the laser welding method of this invention and how zinc vapors are allowed to escape when using the laser welding method of this invention.

Referring now to FIG. 2, as the laser beam 34 is moved vertically upward, it melts the material of the sheets and it causes a keyhole cavity 42 to be formed that is defined by liquid or molten material designated as 44. This cavity may be about 0.020 inches wide. The leading edge of the cavity is designated as 42A and its trailing edge as 42B. It should be kept in mind that the cavity 42 is moving vertically upwardly as laser beam 34 is moving vertically upwardly. The molten or liquid material that has been heated to that state by the laser beam moves vertically downwardly by gravity. Some of this molten metal that has moved vertically downwardly is designed as 44A. The vertical downward flow of liquid or molten material elongates the keyhole cavity 42 in a vertical direction as compared to a keyhole cavity that is developed by laser welding where the sheets are welded while in a horizontal position. The effect of elongating the keyhole cavity is that the keyhole cavity remains open for a longer period of time which therefore allows more time for zinc vapors to escape from the cavity before it closes by the solidification of the molten or liquid material.

Some of the zinc vapors that escape from cavity 42 are shown by arrows and designated as 48. Further, some zinc vapors escape as depicted by arrow 50. As the molten metal cools, it forms a solid welded vertically extending weld nugget 49 that has no cavity, that is, the molten metal fills the keyhole previously created during the vertical welding.

In addition to what has been described, FIG. 2 illustrates the application of cover gas to the weld zone.

In the practice of the method of this invention, FIG. 1 shows an arrangement wherein the panels 10 and 12 are held in a fixed vertical position and the laser generator is moved vertically upwardly. The method of this invention could be practiced by holding the laser beam generator 32 fixed and moving the panels 10 and 12 vertically downwardly.

In the foregoing description of the method of this invention, it has been pointed out that sheets 10 and 12 are in a vertical position. It is believed that the method of this invention can be practiced where the sheets 10 and 12 are not precisely in a vertical position. Thus, it is believed that the sheets 10 and 12 can be positioned generally in a vertical position, that is, where the sheets would be positioned at an angle to the vertical position of, for example, less than about twenty degrees. The angular departure from the vertical position should not be so great as to prevent substantial flow of melted molten material in a vertical downward direction by gravity during laser welding.

In the practice of the method of this invention, and assuming that the steel sheets are about 0.028 inches thick, the laser power may be about 2.5 kw and the laser beam 34 may be moved at a rate of about 85 inches per minute.

This invention is applicable to the laser welding of galvanized steel sheets where the steel sheets are coated with zinc or are coated with a material that is comprised of zinc and other coating material and where the coating is primarily zinc.

The embodiments of the invention in which an exclusive property or privilege is claimed are defined as follows:

1. A method of laser lap welding two sheets of steel which have coatings of zinc on opposed sides thereof, the steps comprising, positioning said sheets in a generally vertical position and holding said sheets engaged, directing a laser beam against an outer surface of one of said sheets, and then moving said sheets and laser beam relative to each other in a vertical direction such that said laser beam melts the material of said sheets progressively in a vertical upward direction to create a cavity and such that melted molten material of said sheets flows vertically downwardly by gravity to thereby facilitate the escape of zinc vapors caused by vaporization of said zinc by said laser beam.

2. The method according to claim 1 where said sheets are held fixed from vertical movement and said laser beam is moved vertically upwardly.

3. A method of laser lap welding two sheets of steel which have coatings of zinc on opposed sides thereof, the steps comprising, positioning said sheets in vertical position and holding said sheets engaged, directing a laser beam against an outer surface of one of said sheets in a direction that is substantially normal to said sheets, and then moving said sheets and laser beam relative to each other in a vertical direction such that said laser beam melts the material of said sheets progressively in a vertical upward direction to create a cavity and such that melted molten material of said sheets flows vertically downwardly by gravity to thereby facilitate the escape of zinc vapors from said cavity caused by vaporization of said zinc by said laser beam.

4. The method according to claim 3 where said sheets are held fixed from vertical movement and said laser beam is moved vertically upwardly.

* * * * *